(12) United States Patent
Bell et al.

(10) Patent No.: US 7,181,526 B1
(45) Date of Patent: Feb. 20, 2007

(54) ANNOUNCED SESSION DESCRIPTION

(75) Inventors: Sarah Bell, Cottenham (GB); Sarom Ing, Ipswich (GB); Steven Rudkin, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/830,461

(22) PCT Filed: Nov. 19, 1999

(86) PCT No.: PCT/GB99/03871

§ 371 (c)(1),
(2), (4) Date: Apr. 27, 2001

(87) PCT Pub. No.: WO00/36804

PCT Pub. Date: Jun. 22, 2000

(30) Foreign Application Priority Data

Nov. 27, 1998 (GB) .................................. 9826158.9

(51) Int. Cl.
*G06F 15/16* (2006.01)
*H04J 3/16* (2006.01)

(52) U.S. Cl. ...................... 709/231; 370/469; 370/390; 370/466; 370/487; 370/420; 370/421

(58) Field of Classification Search ................ 709/231, 709/232, 234, 200, 203, 204, 217, 229, 227, 709/226; 370/390, 466, 408, 486, 401, 421, 370/420, 487, 400, 469, 908

See application file for complete search history.

(56) References Cited

U.S. PATENT DOCUMENTS

| | | |
|---|---|---|
| 5,557,320 A | 9/1996 | Krebs |
| 5,757,669 A | 5/1998 | Christie et al. |
| 5,802,466 A | 9/1998 | Gallant et al. |

(Continued)

FOREIGN PATENT DOCUMENTS

EP 0367700 A2 5/1990

(Continued)

OTHER PUBLICATIONS

Thomas Sikora, "The MPEG-4 Video Standard Verification Model", Feb. 1997, Circuits and Systems for Video Technology, IEEE, pp. 19-31, vol. 7, Issue 1.*

(Continued)

*Primary Examiner*—John Follansbee
*Assistant Examiner*—Ashok Patel
(74) *Attorney, Agent, or Firm*—Nixon & Vanderhye PC

(57) ABSTRACT

A method of announcing a description of a media session, for example a multimedia conference, that is to take place over multicast capable links is provided in networks configured for Internet Protocol operation. A modular method of announcing media sessions includes: (a) generating a first base module having a first data structure having user oriented data relevant to the media session; (b) generating at least one media module having a second data structure with media oriented data necessary for a user to receive a respective media stream of the media session; (c) providing a link between the first base module and the at least one media module; and, (d) announcing the media session by making at least the first base module available to potential recipients of the media session.

13 Claims, 7 Drawing Sheets

U.S. PATENT DOCUMENTS

| | | | |
|---|---|---|---|
| 5,930,337 A | | 7/1999 | Mohler |
| 5,940,391 A | * | 8/1999 | Malkin et al. .............. 370/390 |
| 6,088,732 A | | 7/2000 | Smith et al. |
| 6,105,069 A | | 8/2000 | Franklin et al. |
| 6,163,531 A | * | 12/2000 | Kumar ....................... 370/260 |
| 6,259,701 B1 | * | 7/2001 | Shur et al. .................. 370/401 |
| 6,396,513 B1 | | 5/2002 | Helfman et al. |

FOREIGN PATENT DOCUMENTS

| | | |
|---|---|---|
| EP | 07988905 A2 | 10/1997 |
| EP | A-0 798 905 | 10/1997 |
| EP | 0887995 A2 | 12/1998 |
| GB | 9826157.1 | 11/1998 |
| GB | 9913921.4 | 6/1999 |
| WO | WO 97/22201 | 6/1997 |
| WO | WO 00/31930 | 6/2000 |
| WO | WO 00/33535 | 8/2000 |

OTHER PUBLICATIONS

"SDP:Session Description Protocol", RFC2327, Apr. 1998, pp. 1-42,XP002101463.www.cis.ohio-state.edu/htbin/rfc/rfc2327.html.*

Avaro et al, "The MPEG-4 Systems and Description Languages: A Way Ahead in Audio Visual Information Representation" Signal Processing. Image Communication, NL, Elsevier Science Publishers, Amsterdam, vol. 9, No. 4, May 1, 1997, XP004075337.

Thimm et al: "A Mail-Based Teleservice Architecture for Archiving and Retrieving Dynamically Composable Multimedia Documents" Multimedia Transport and Teleservices, International Cost 237 Works Proceedings, Vienna, Nov. 13-15, 1994, pp. 14-34, XP000585292.

"SDP: Session Description Protocol", RFC2327, Apr. 1998, pp. 1-42, XP002101463, http://WWW.cis.ohio-state.edu/htbin/rfc/rfc2327,html.

Liechti et al., "Structured Graph Format: XML Metadata for Describing Web Site Structure" Computer Networks and ISDN Systems, NL, North Holland Publishing, Amsterdam, vol. 30, No. 1-7, Apr. 1, 1998, pp. 11-21, XP004121444.

Laier et al., "Content-Based Multimedia Data Access in Internet Communication", found in a paper entitled: Wireless Image/Video Communications, 1996., F. International Workshop, Sep. 1996, pp. 125-133.

Avaro et al., "The AVIS Project: A Mixed Communication/Interactive/Broadcast Teleconferencing System", Protocols for Multimedia Systems—Multimedia N 1997, Proceedings, IEEE Conference, Nov. 1997, pp. 37-43.

International Search Report—PCT/GB99/03831.

International Search Report—PCT/GB99/03871.

Thomas Sikora, "The MPEG-4 Video Standard Verification Model", Feb. 1997, Circuits and Systems for Video Technology, IEEE, pp. 19-31, vol. 7, Issue 1.

Rudkin et al, "A Scheme For Component Based Service Deployment", Trends in Distributed Systems:Towards a Universal Service Market, Third International IFIP/GI Working Conference, USA 2000, Proceedings (Lecture Notes in Computer Science vol. 1890), Trends in Distributed Systems: Towards a Universal Service Market, pp. 68-80, XP001020425, 2000.

Matsubara et al, "Worldwide Component Scripting witht the Planet Mobile Object System", Worldwide Computing and Its Applications—WWCA '98. Second International Conference Proceedings, Worldwide Computing and Its Applications—WWCA '98. Second International Conference Proceedings, Tsukuba, Japan, Mar. 4-5, 1998, pp. 56-71, XP001023132, 1998.

* cited by examiner

ANNOUNCED SESSION DESCRIPTION

BACKGROUND OF THE INVENTION

1. Field of the Invention

The present invention relates to the announcement of media stream connections for a media session over a communications network.

2. Related Art

Multicast transmissions are becoming increasingly common on the Internet. In contrast to standard Internet Protocol (IP) point to point transmissions (unicast), IP multicast allows the simultaneous transmission of information to a group of recipients from a single source. Routing support for IP multicast transmissions is provided by the MBone (IP Multicast Backbone) which is a virtual network layered on top of the Internet.

IP multicast allows real-time communications over wide area IP networks and typical transmissions include video and audio conferencing, live multimedia training, university lectures and transmission of live television programmes.

A multicast transmission usually consists of a multimedia session made up of several individual media streams typically carrying video, audio, whiteboard or raw data. Some sessions are persistent, but the majority exist for a specific period of time, although need not be continuous. Multicast based transmissions on the MBone differ from unicast IP transmissions in that any user receiving the transmission can join the session (unless the transmission is encrypted) and to receive a transmission, a user need only know the appropriate transmission address and timing information.

Prior to a multicast transmission an appropriate announcement containing a session description is made, usually at an IP group multi-cast address. Standard session descriptions are generated using a Session Description Protocol (SDP), as defined in the Internet Engineering Task Force's draft RFC 2327. SDP is a simple ASCII text based protocol that is used to describe real time multimedia sessions and their related scheduling information. SDP messages are wrapped in a carrier protocol, known as a Session Announcement Protocol (SAP), which, in addition to containing the necessary IP addressing and routing information for transmission across the Internet or MBone, allows the SDP message to be encrypted, signed or compressed. An announcement can then be sent at regular intervals to the announcement group address. As an alternative to SAP, a session may be announced by placing an SDP message on a World Wide Web site (WWW) or by sending it to individuals by email or as a unicast transmission inviting them to participate.

An SDP message conveys information about each media stream in the multicast multimedia session to allow the recipients to participate in the session. A typical SDP message will include the session name and purpose, the time(s) and date(s) the session will be active, the component media streams of the session and information required to participate in each media stream (IP multicast address, port, media format). The SDP message may also include details of the session's bandwidth requirements, an encryption key necessary to participate in a secure multicast transmission using public key encryption, contact information for the organiser of the multicast session, and a Unique Resource Indicator (URI) pointing to a WWW or an Intranet web site where further information on the session may be found, for example, background information relating to the conference.

The level of participation a user may make in a session or stream depends on its purpose. In a multicast television session, typically users would only be able to receive the session streams whilst in a multicast conference session the communication would be bi-directional with a central server (such as group address 120) receiving each participants transmissions and relaying them to the other participants. The level of participation expected of a user in a session or stream may be explicitly stated in the session description or it may be inherent from the session description, for example when a receive-only application is associated with a media stream type in the session description.

A common front end interface used by multicast end users is known as Session Directory Rendezvous (SDR). This interface takes the received announcements, decodes the SDP message and displays the names of those sessions that are still current in a list. The end user may then select one of the listed announcements to view further technical and user-oriented details of the announced session. From the displayed information, the end user can then select to join individual streams of the session or to join the entire session. Once the streams to be joined are selected, SDR starts the necessary multicast-enabled multimedia application on the end user's computer, such as Vic and Vat, and passes the relevant stream information (a transport port address) from the announcement onto the application allowing the application to establish the link to the associated IP multicast address and participate in the stream at transmission time. Having initiated the applications and passed the relevant transport port address SDR plays no further part in the session.

Recent increased usage and demand for (multi)media sessions has highlighted a number of limitations in SDP. SDP limits session descriptions to defining a session having a single set of timings that apply to all of the streams within it. A session in which a stream starts mid-way through the transmission cannot easily be described using SDP. The structure of a session description written in SDP must be a simple linear list of streams which may not reflect the intuitive structure of a complex session. SDP supports a limited and predefined set of applications which can receive the streams and a limited and predefined set of transport mechanisms (e.g. Simple layering, RTP and UDP). As guaranteed Quality of Service (QoS) is becoming more and more desirable to the consumer and the supplier, the need to define QoS policies for the entire session and individual streams in terms of required system resources, bandwidth requirements and supported applications also needs to be met. There may also be requirements on the prioritisation of streams and subsessions or more complicated rules about receiving streams. A further requirement on the part of the supplier will be the need for charging facilities permitting the charging of an end user for a multicast transmission to which they subscribe according to the QoS and types of streams received etc. There is little scope to include information about QoS policies or charging within the conventional structure of an SDP session description, or any metadata about the session.

BRIEF SUMMARY OF THE INVENTION

According to a first aspect of the present invention there is provided, a method of announcing a description of a media session, comprising the steps of:

generating a first base module having a first data structure comprising user oriented data relevant to the media session;

generating at least one media module having a second data structure comprising media oriented data necessary for a user to receive a respective media stream of the media session;

providing a link between the first base module and the at least one media module; and, announcing the media session by making at least the first base module available to potential recipients of the media session, wherein the link between the first base module and the at least one media module permits a user to access the at least one media module and subsequently receive the media stream.

The present invention provides a modular description system for a media session in which session descriptions are constructed in a hierarchical manner providing a plurality of levels of information concerning the constituent parts of the described session.

A problem faced with the current distribution of announcements from the single announcement group address is that there is a limit to the size of each announcement and the frequency with which each can be sent out. In the present invention, it is possible to provide a modular description system in which a distributed announcement contains links available to the end user to other portions of the announcement which have not been transmitted.

Preferably, the method further comprises the steps of: generating a second base module, the second base module containing user orientated data relating to a sub-session of the media session; linking the second base module to the first base module; and, linking said at least one media module to the second base module.

In preferred embodiments, the method further comprises the steps of: generating at least one options module having a third data structure comprising data relating to service level criteria required to participate in the media session; and, linking the or each options module to a respective base module.

The data contained in the options module may relate to a quality of service policy to be used by the media session or a part thereof. Alternatively, the data contained in the options module may relate to a security system to be used by the media session or a part thereof. The data contained in the options module may further relate to a charging system to be used by the media session or a part thereof.

In preferred embodiments, one or more media module(s) comprise data necessary for a user to receive a layered media stream of a respective media session; and said method further comprises the step of linking the or each media module to one or more respective options module(s) containing data relating to a layered mechanism of the respective layered media stream necessary for a party to participate in the layered media stream.

The media session may be announced by transmitting all of the constituent modules of the session description. Alternatively, the media session may be announced by transmitting only some of the constituent modules of the session description, with the remaining modules of the session description being subsequently accessible by a user using one or more links provided in the modules transmitted. The remaining modules of the session description may be held on one or more servers and the one or more links to the remaining modules are in the form of URI pointers. Modules of the session description contain links to modules which are generated subsequent to the announcement.

According to a second aspect of the invention there is provided a computer readable storage medium containing data defining at least a part of a description of a media session, the session description comprising:— a first base module having a first data structure comprising user oriented data relevant to the media session;

at least one media module having a second data structure comprising media oriented data necessary for a user to receive a respective media stream of the media session;

a link between the first base module and the at least one media module;

Another problem faced by providers of current (multimedia sessions and the developers of the associated (multimedia applications is the spread of skills required to implement an application that can initiate and manage a real-time data connection over a communications network and perform the (multi)media functions the end user would expect. For example, developers of multimedia applications require teams with skills in audio and video coding, network transport protocols, real time programming, user interface design and integration techniques. The session description of the present invention simplifies this process by allowing the necessary communication channels and media streams to be identified in the session description. This information is used by generic middleware in the form of a session control and communications manager to dynamically instantiate the respective streams and channels for the applications at run time.

Furthermore, until now the only way a QoS policy could be implemented was to process a session description to determine which streams of a session could or should be run and then to initialise the applications so they connect to the respective streams. This required the communications manager not only to know about the session requirements and available system resources but also the capabilities of each application.

In a preferred example of the present invention the media modules of a session description are checked by the respective multimedia client application prior to QoS management, thereby reducing the workload of the communications manager, that is to say the respective client applications determine whether the media modules can be supported. Furthermore, applications need only request streams from the session control system associated with the client since the session control now handles centrally the creation and management of streams in real time. This aspect is also the subject of our co-pending UK patent application 9826157.1.

The present invention simplifies application development and service provision. A further problem is that applications should be able to adapt to available network and host resources. This is particularly important for multi-party applications operating in heterogeneous environments where each party may have different resources available to them. Furthermore the nature of the heterogeneity may vary over the lifetime of the session, for example as network congestion varies or as the terminal resources are shared with other applications or other users. The present invention is able to use a QoS policy incorporated within the session description to prioritise the allocation of resources and to determine whether participation in the session is viable.

A still further problem is that the application developer and service provider typically need to address security and charging requirements. The present invention allows security and charging policies to be incorporated within the session description for use within the session control system to invoke appropriate charging and security procedures. Instead of having to develop security and charging functions the application developer and service provider need only specify appropriate policies.

In the present invention application development is simplified by using the session description to drive the dynamic management of communication channels and to adapt to available resources. It also reduces the problem of handling charging and security requirements to a matter of specifying charging and security policies within the session description.

BRIEF DESCRIPTION OF THE DRAWINGS

An example of the present invention will now be described in detail with reference to the accompanying drawings, in which.

DETAILED DESCRIPTION OF EXEMPLARY EMBODIMENTS

Figure 1:
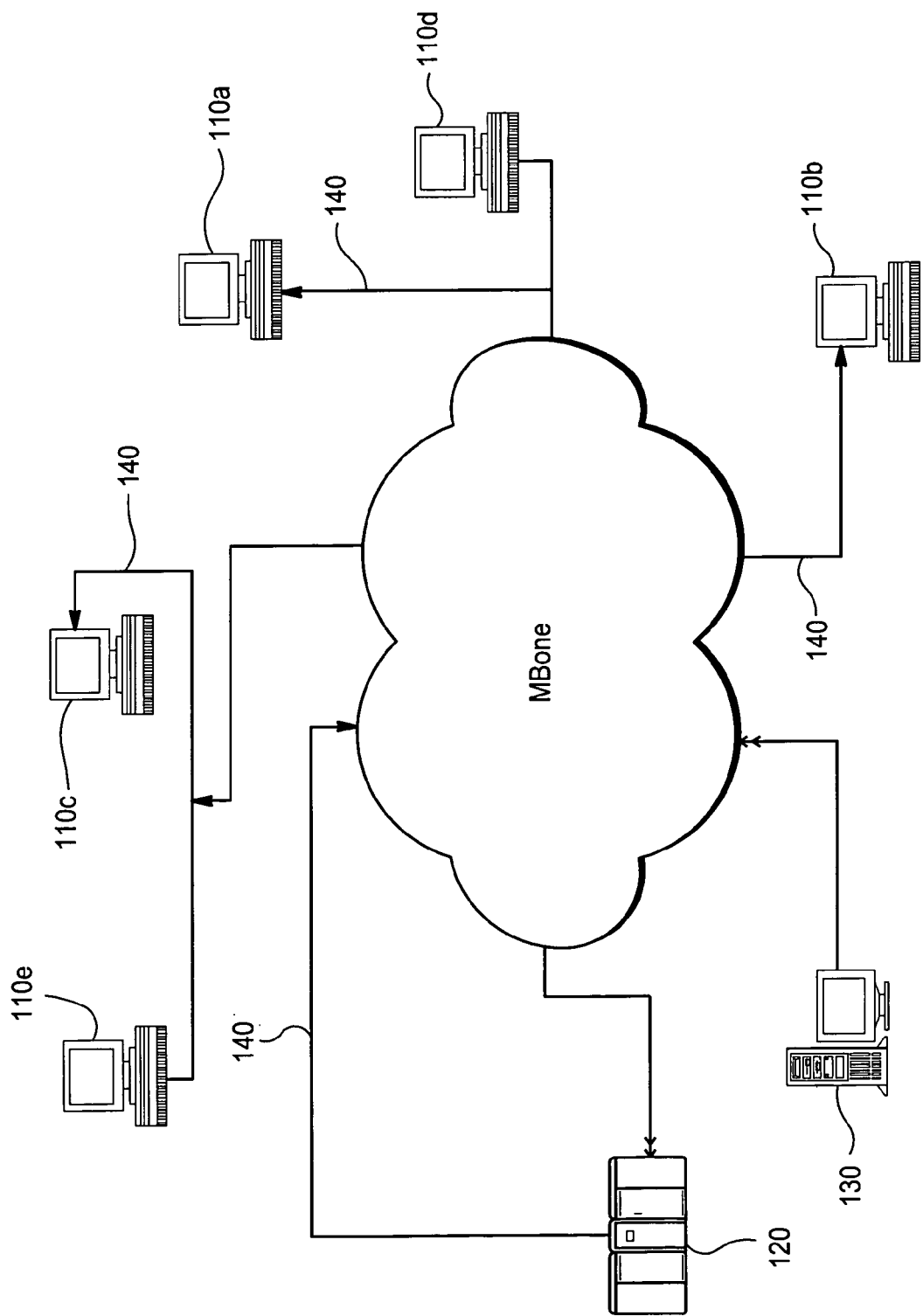
FIG. 1 is a schematic diagram illustrating a multicast transmission across the MBone.

An example of an IP multicast transmission system is described with reference to FIG. 1. Prior to a multicast transmission, an appropriate announcement containing a session description is made, thereby allowing end users 110a–110e to elect to receive the transmission. Each end user electing to receive the transmission is linked to a group IP Multicast address 120 associated with the transmission. At the transmission time of the multicast session, the session streams are transmitted from a source 130, or a plurality of sources, to the group address. At the group address, the transmission is disseminated along the links 140 to those end users who have elected to receive it (in this example end users 110a–110c).

Figure 2:
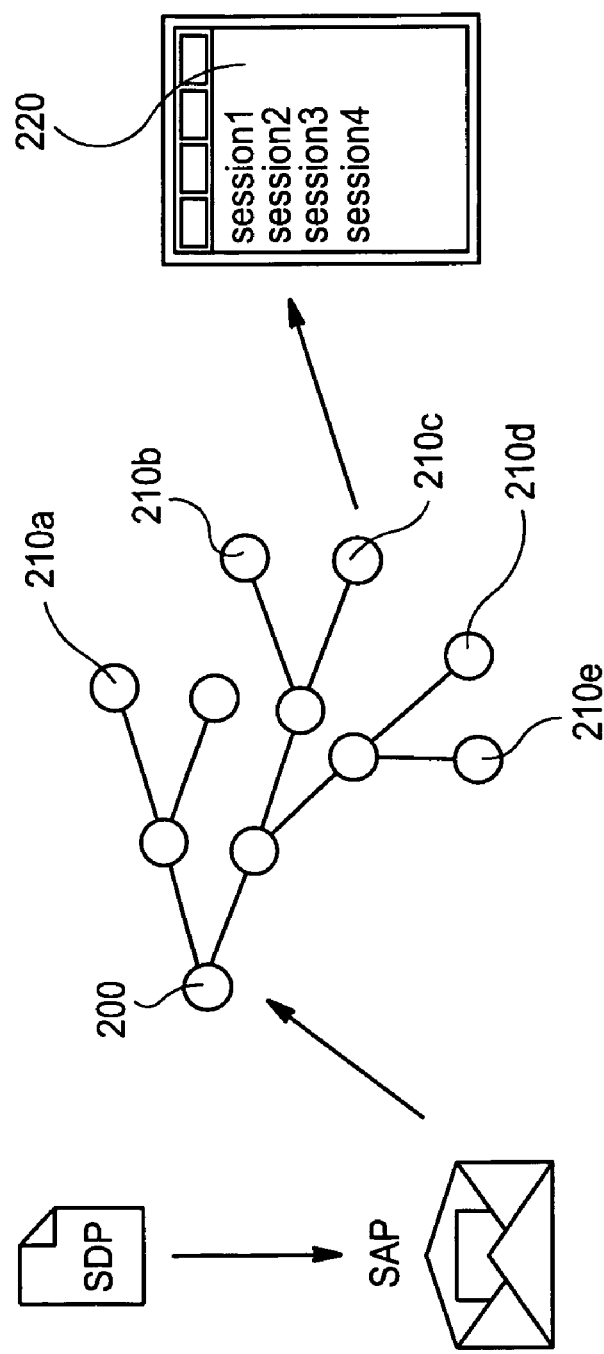
FIG. 2 is a schematic diagram illustrating the distribution of an SDP announcement.

An example of an announcement and election system is described with reference to FIG. 2. Most public multicast sessions are announced at a single group IP multicast address 200 dedicated to the transmission of announcements to multicast end users. End users 210a–210e electing to receive the announcements are linked to the announcement group address and, in the same way as an actual session transmission, each announcement arriving at the announcement group address is disseminated to the end users. A front end interface 220 on each end user's computer displays information obtained from the associated session description for each announcement. The minimum information a session description may contain is a time and date that the session will be active and the group IP multicast address(es) from which the end user may elect to receive one or more media streams and to which they could send their own streams for the session. Using the front end interface, an end user can select the announced session(s), or their component stream (s) they wish to participate in.

Figure 3:
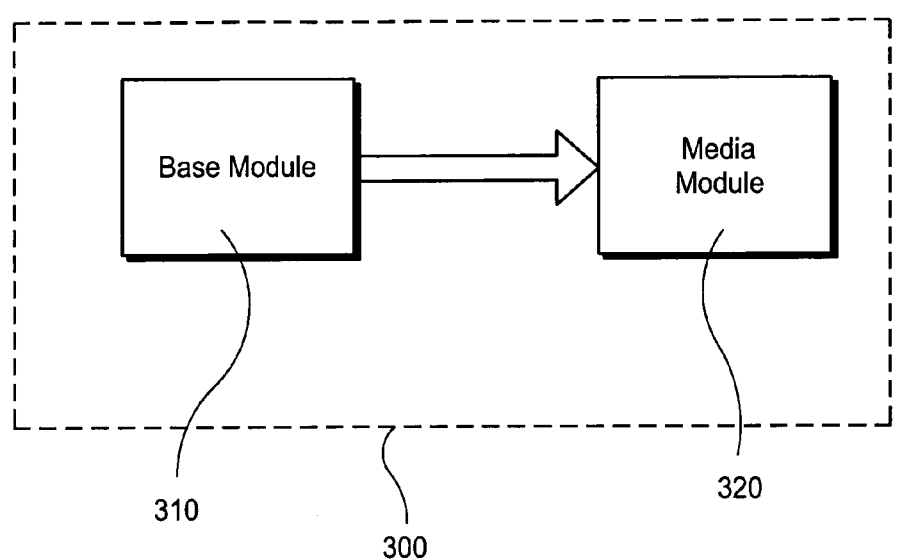
FIG. 3 is a block diagram of a modular session description of a simple session generated in accordance with the present invention.

FIG. 3 is a block diagram of a session description 300 for a simple multicast television session. The session description 300 comprises a base module 310 linked to a media module 320.

The base module 310 contains user oriented data relating to the session including the title and timing information. The base module 310 may also include a description or abstract, contact information about the organiser and a WWW or an intranet URI pointing to a web site containing further information. Ideally, the base module 310 should contain enough information for the user to decide if they are interested in participating in the session.

The media module 320 contains announcement data relating to a video stream of the session. The media module 320 contains the technical information (data) necessary for the user to receive the associated media stream. In particular, connection, timing and media format details are provided.

A first example of a session description 300 generated for transmission to end users is shown below:

(
type=(base)
id=(310)
info=(title="live multicast television session")
source=(name="A.Sender" email=asender@tx.com)
media=(video=(client=odbits0.16))
time=(length=50 m repeat=continuous)
category=("Entertainment")
options=(none)
modules=(m=320)
)
(
type=(media)
id=(320 310)
media=(video=(client=odbits0.16))
connection=(229.1.1 2/7000)
time=(length=50 m)
)

Session Description Example 1

The base module 310 has a unique identifier (id field) used in the generation of links between two modules during the processing of the session description. The modules field of the base module 310 lists the type and unique identifier of the media module 320 linked to the base module 310. The second identifier in the id field of the media module 320 is the unique identifier belonging to the base module 310 linking the media module back to the base module 310. By extension, these two-way links permit a module tree to be traversed from a base module downwards or from a media module upwards. The use of this feature is described later with reference to session description example 4.

The connection field of the media module 320 contains the IP multicast address and port number from which the media stream can be received.

Figure 4:
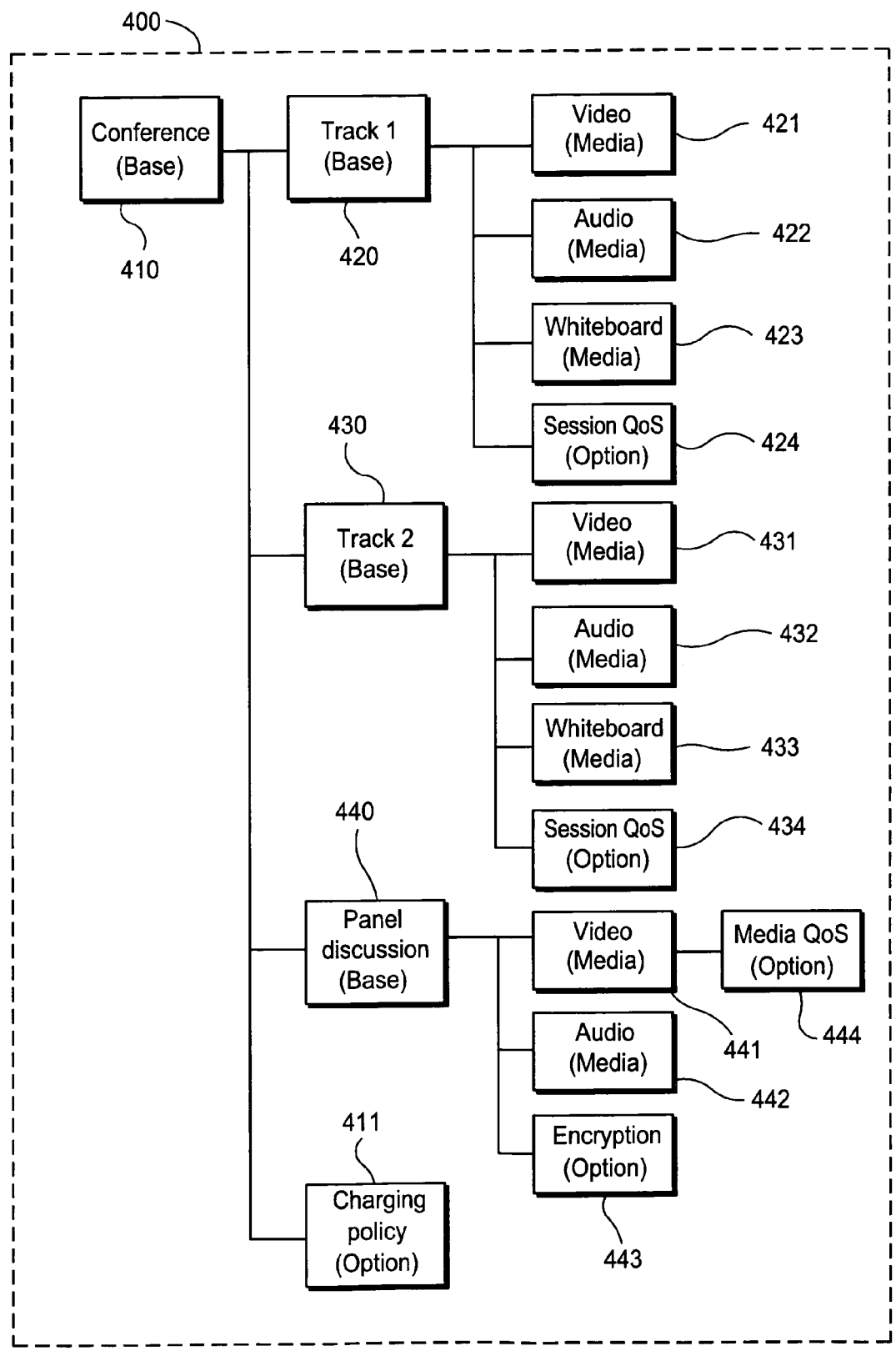
FIG. 4 is a block diagram of a modular session description of a complex session generated in accordance with the present invention.

FIG. 4 is a block diagram of a session description 400 for a complex multicast session of a multimedia conference with two tracks, or sub-sessions, and a panel discussion. Each track provides multiparty video and audio conferencing and a shared whiteboard for leaving notes and messages. The panel discussion is encrypted and the whole conference is subject to a subscription fee payable in advance by each participant.

The session description 400 contains a top level base module 410 linked to further base modules 420, 430, 440 and an options module 411. The top level base module 410 contains data relating to the overall session including its name, purpose and timing information. The options module 411 contains details of the payment mechanism for subscription fees.

Each further base module 420, 430, 440 relates to a subsession of the conference. Base module 420 relates to the first track of the conference. The base module 420 is linked to media modules 421–423, each containing connection, timing and media format data for respective video, audio and whiteboard streams.

The base module 420 is also linked to options module 424 which contains data relating to a QoS policy for the first track defining which media modules are optional and which are mandatory for a participant of the first track. The mandatory list contains identifiers of those media modules which are needed for the session or subsession to operate correctly whilst the optional list contains identifiers of the media modules that are not necessary for the session or subsession to operate correctly if system resources are scarce.

The base module 430 relates to the second track of the conference. It is linked to media modules 431–433, each containing connection, timing and media format details for respective video, audio and whiteboard streams. The base module 430 is also linked to options module 434 which contains data relating to a QoS policy for the second track defining which media modules are optional and which are mandatory for a participant of the second track. Base module 440 relates to the panel discussion. It is linked to media modules 441 and 442, each containing connection, timing and media format details for respective video and audio streams of the panel discussion. The base module 440 is also linked to options module 443 which contains encryption details (ie. how and where to get the necessary cryptographic keys) necessary for a participant to decode the panel discussion media streams 441, 442 according to a known encryption mechanism such as DES or public key encryption.

The video media stream defined in media module 441 is layered. Layering of media streams allows users with different system resources to receive as much of the stream as their system resources allows. Every user must receive the bottom layer of the stream containing the minimum stream data. However, if a user has sufficient free system resources they can receive the next layer up containing enhancements to the previous layer. Successive layers can be received enhancing the received media stream until the maximum number of layers is received or all free system resources capacity is used. The media module 441 is linked to an options module 444 which contains data on the layering necessary for the end user to be able to receive the layered stream correctly.

The portion of the session description 400 generated for modules 410, 411, 420 and 440 for transmission to end users is shown below in session description example 2.

```
(# overall conference session
    type=(base)
    id=(410)
    info=(title="Multimedia98 Conference")
    source=(owner="Joe Bloggs"
        email=joe@nowhere.com)
    media=(video=(client=RealPlayerG2) whiteboard=
        (client=wb))
    time(start="09:00 GMT 25/12/98" stop="13:00 GMT
        25/12/98")
    options=(oc=411)
    modules=(b=420 b=430 b=440 oc=411)
)
(# conference track 1
    type=(base)
    id=(420 410)
    info=(title="MM98 Systems and Applications Track")
    source=(owner="Joe Bloggs"
        email=joe@nowhere.com)
    media=(video=(client=RealPlayerG2) whiteboard=
        (client=wb))
    time(start="09:00 GMT 25/12/98" stop="11:00 GMT
        25/12/98")
    options=(osq=424)
    modules=(m=421 m=422 m=423 osq=424)
)
(#session QoS for track 1
    type=(option-sQoS)
    id=(424 420)
    mandatory=(421 422)
    optional=(423)
)
(# conference panel discussion
    type=(base)
    id=(440 410)
    info=(title="MM98 Panel Discussion")
    source=(name="Joe Bloggs"
        email=joe@nowhere.com)
    media=(video=(client=RealPlayerG2) whiteboard=
        (client=wb))
    time(start="11:00 GMT 25/12/98" stop="13:00 GMT
        25/12/98")
    options=(osec=443)
    modules=(m=441 m=442 osec=443)
)
(# video for panel discussion
    type=(media)
    id=(441 440)
    info=(title="MM98 Panel Discussion Video")
    source=(owner="Joe Bloggs"
        email=joe@nowhere.com)
    media=(video=(type=live client=RealPlayerG2))
    connection=(226.0.0.106/1010 policy=444)
    time=(start="11:00 GMT 25/12/98" stop="13:00 GMT
        25/12/98")
)
(# media QoS policy for panel discussion video
    type=(option-mQoS)
    id=(444 440)
    mechanism=(layer=(base=226.0.0.106/1010 num-
        ber=3))
)
(# encryption policy for panel discussion
    type=(option-sec)
    id=(443 440)
    participant=(member=w3c)
    publickey=(location=http://www.w3.org/member-
        s_only/)
    info=(location=http://www.w3.org/)
)
(# charging policy for entire conference
    type=(option-chg)
    id=(411 410)
    mechanism=(type=AAA)
    price=(fee=1000 GBP)
    info=(location=http://www.aaa.net/)
)
```

Session Description Example 2

Where there is surplus network bandwidth available, complete session descriptions can be announced to end users who may then elect to receive the announced session or parts thereof. However, the individual modules of the session description do not need to be announced together. If the network bandwidth available for announcements restricts the size of session descriptions, only the top level base module may be announced. In this situation, the link between modules may be, for example, a URI to a WWW or an intranet web site or server, an email address, an IP multicast address, an FTP address or details of a file or database stored on a local computer system from which an interested user can obtain the remaining modules.

The following session description example illustrates how the above session description for base module 420 would be changed if media module 421 was stored on a WWW server:

(# conference track 1
   type=(base)
   id=(420 410)
   info=(title="MM98 Systems and Applications Track")
   source=(owner="Joe Bloggs" email=joe@nowhere.com)
   media=(video=(client=RealPlayerG2) whiteboard=(client=wb))
   time(start="09:00 GMT 25/12/98" stop="11:00 GMT 25/12/98")
   options=(osq=424)
   modules=(m=421 location=http://www.announce.org/cgi-bin/module.cgi?id=421 m=421 m=423 osq=424)
)

Session Description Example 3

Furthermore, top level modules of a session description may be announced well in advance of the actual transmission, at a time where the final details of content are unknown, in which case the remaining levels may be made available from pre-announced links at a later time.

Figure 5:
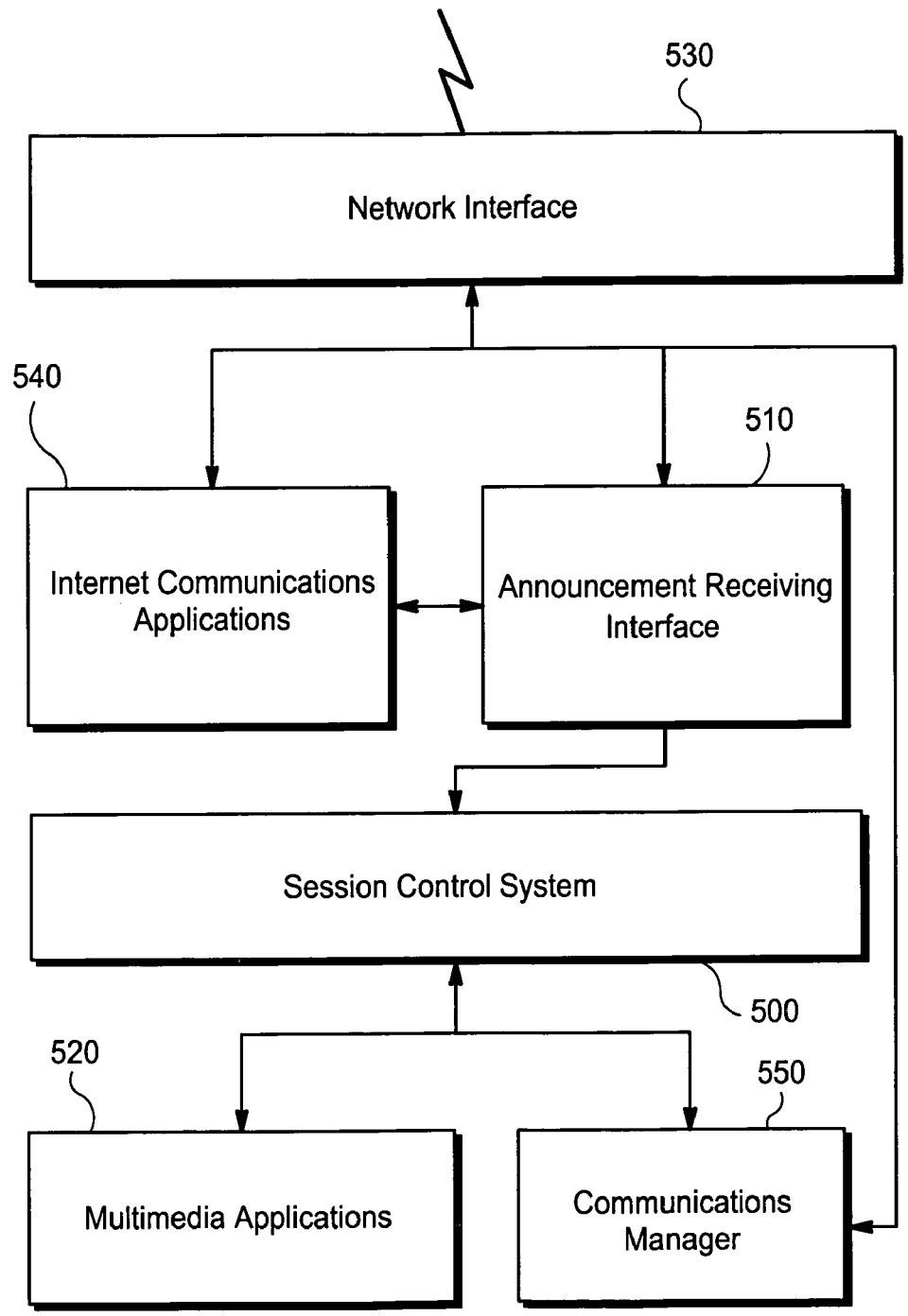
FIG. 5 is a schematic diagram of a system for managing media stream connections.

FIG. 5 is a schematic diagram of a system for managing media stream connections at a terminal of an end user system according to the present invention.

The session control system 500 is linked to an announcement receiving interface 510 and one or more multicast-capable multimedia applications 520. The session control system 500 and the announcement receiving interface 510 are connected to a network interface 530 via which announcements may be received and multicast transmissions may be initiated and/or received.

Announcements received at the network interface 530 are routed to the receiving interface 510. The receiving interface 510 decodes each announcement to obtain the session description and displays the user oriented information from the one or more base modules in a list to the user. The user is able to select a session description from the list announcing a session they wish to receive. The selected description is passed to the session control system 500 which determines which of the user's multimedia applications 520 are required for participation in the described session, starts the applications and initiates and provides the necessary media streams to the respective applications 520 via a communications manager 550.

The receiving interface 510 may be linked to other Internet communications applications 540 such as a WWW browser or an email client (not shown) which may be used to gather further information on the described session based on links provided in the session description. Also, where an incomplete set of base and/or media modules of a session description are received, the receiving interface 510 attempts to obtain the remaining modules using the Internet communications applications prior to passing it onto the session control system 500.

Figure 6:
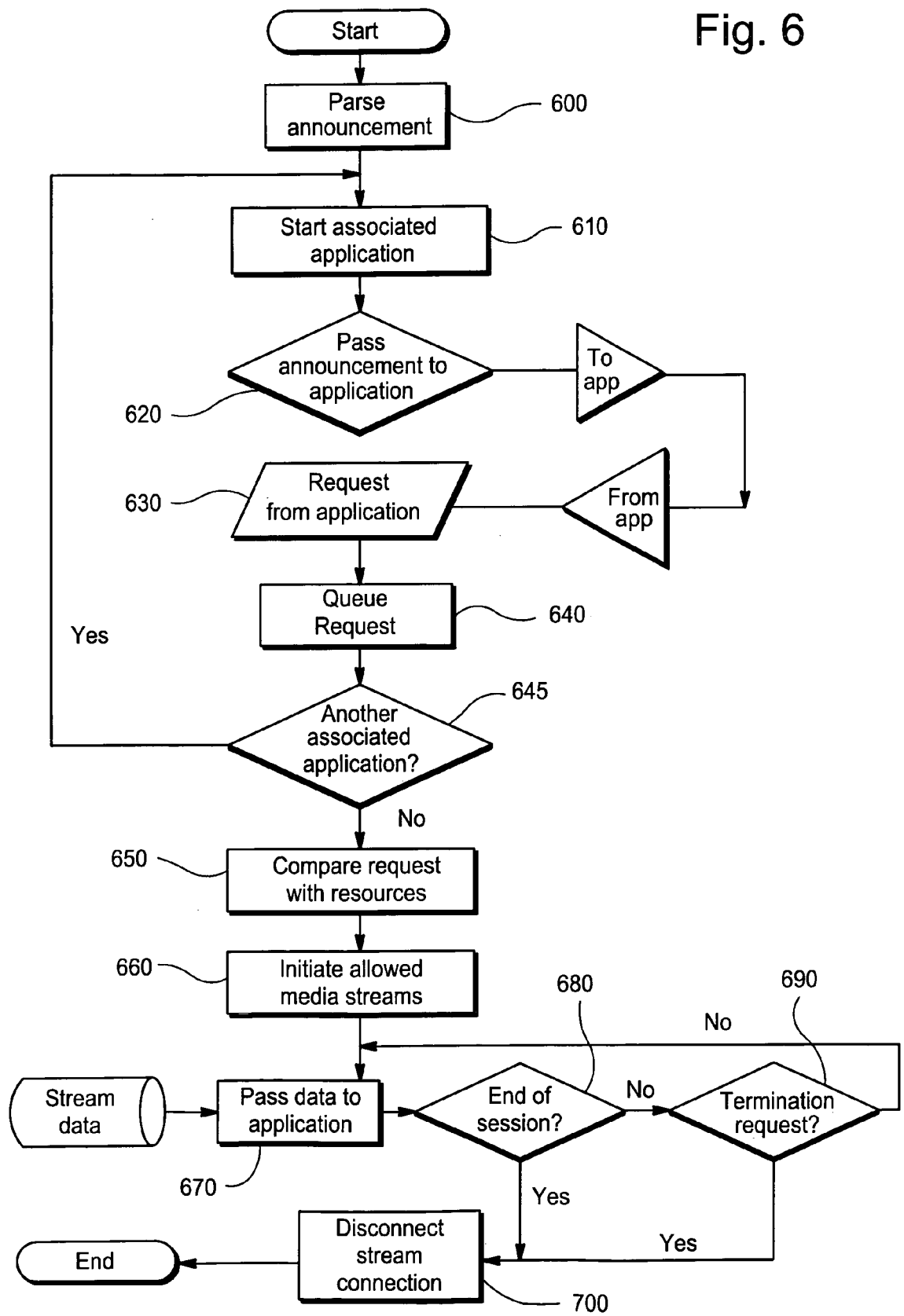
FIG. 6 is a flow chart illustrating the steps involved in managing a media session according to the system of FIG. 5; and, FIG. 7 is a flow chart further illustrating a parsing step of FIG. 6.

FIG. 6 is a flow chart showing the steps taken by the session control system 500 upon receipt of a session description. The description is first parsed in step 600 to identify client applications for each media module. Once this is done a second parse is carried out where applications are launched in step 610, that is to say for each media module start the application specified in the client field if that application has not already been started. The portion of the session description relating to the respective media type, i.e. the media module, the base module directly above the media module, all other modules attached to that base module and any other options modules that apply, is passed to the corresponding application in step 620. Since the media modules are marked with appropriate client applications, each application will be able to select those media streams that it wants to participate in. The application replies to the session control system with a connection request specifying its requirements in the form of a list of identifiers of media modules from which streams are to be initiated in step 630. The connection request is assembled by the session control system in step 640 and the system then parses the session description to identify other applications to launch in step 645. If a further media type is found, steps 610 to 640 are repeated, otherwise the session control system uses the assembled connection requests to form a list of media modules. This list is passed, together with a session QoS policy, to the communications manager, a system used in by the session control system, which determines according to the QoS policies and available system resources whether each connection request is viable.

The session QoS policy is constructed in two steps:—first, the multiple session QoS policies relevant for all the media modules to be initiated are combined into one session QoS policy: second, the resulting session QoS policy may be adapted to take account of (a) user default preferences (defined in a user profile), (b) a user's wish to determine the policy interactively, and (c) an application's default configuration (defined in the application profile(s)).

The communications manager responds to the session control system in step 650 with an indication of the viable media stream connection requests. If necessary, the session control system may contact a charging system to initiate accounting for the session prior to requesting the communications manager to create the viable media stream connections in step 660.

Once a session starts, each received data stream relating to the session is passed to the associated multimedia application in step 670 until the scheduled stream time ends in step 680 or the multimedia application requests to the session control system that the connection is terminated in step 690, at which point the session control system disconnects the connection in step 700.

Figure 7:
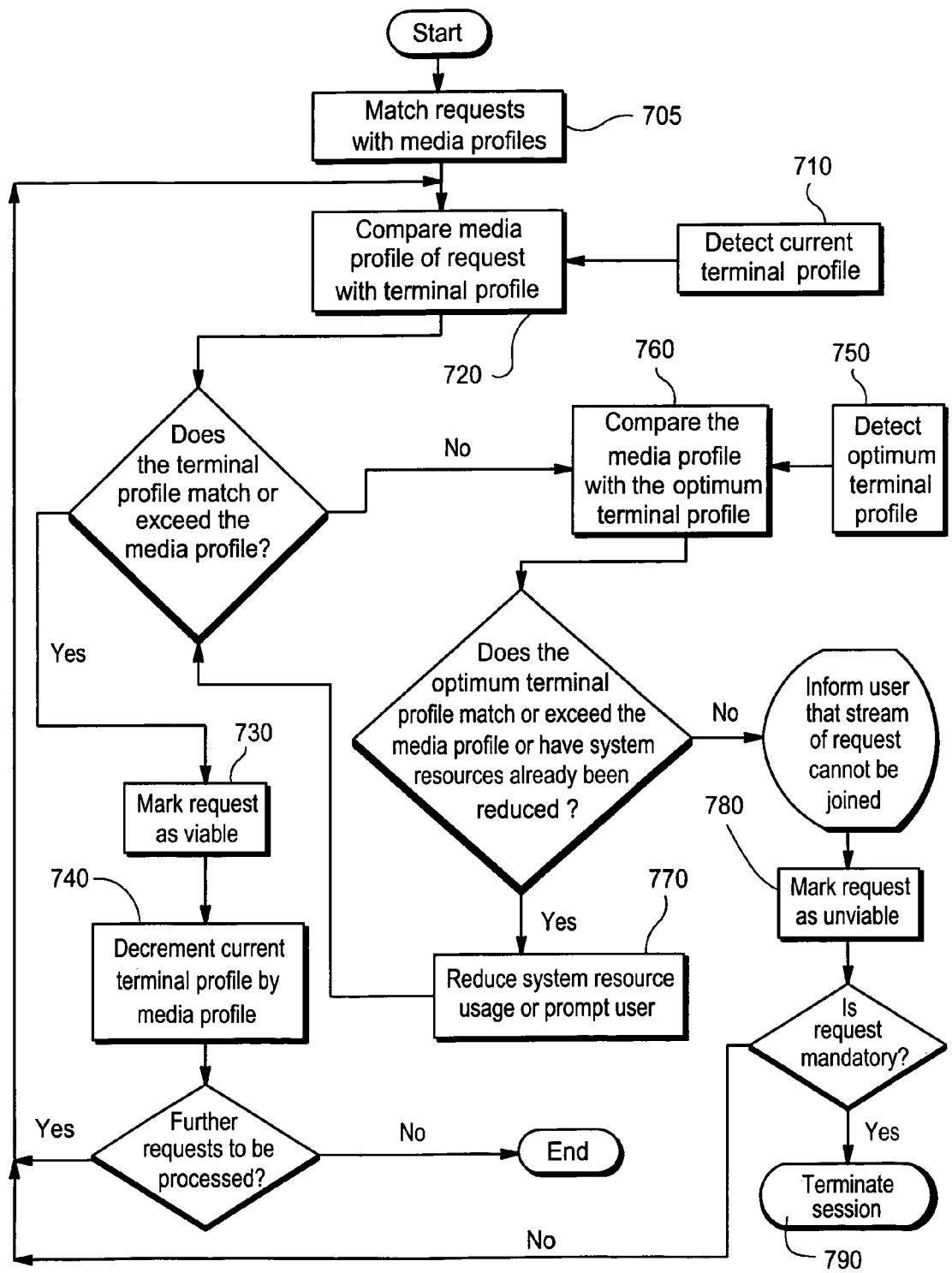

FIG. 7 is a flow chart showing the QoS management step 650 of FIG. 6 in greater detail.

Having received the assembled list of connection requests, the communications manager matches each item of this list to a media profile in step 705. A media profile defines requirements which must be met for the requested media stream to operate on the end user's computer including the minimum network bandwidth needed for satisfactory reception of the stream.

A terminal profile is determined in step 710. The terminal profile defines the resources which are available at the end user's computer for use by the requested media streams. This includes available network bandwidth, free memory and disk space and available hardware such as monitor size, processor speed and free audio and video capture devices. The media profile of each connection request is compared against the available system resources defined by the terminal profile in step 720. If the terminal profile matches or exceeds the media profile, the connection request is declared viable in step 730 and the terminal profile is decremented accordingly for the remaining connection requests in step 740. Each connection request is processed until there are no remaining requests or until the media profile of a request exceeds the terminal profile. In this situation, the communications manager determines the optimum terminal profile the user's computer would have if all non-essential applications were not running in step 750 and whether the computer is capable of fulfilling the media profile in step 760. If the computer is capable of fulfilling the media profile, the communications manager attempts to free system resources from currently allocated streams or connection requests which have lower priority or by asking the user to terminate other non-essential applications running on the computer in step 770. Alternatively, this could be done by reducing the number of layers received from a layered stream transmission. If sufficient resources cannot be found an exception is reported to the user and the connection request is marked as unviable. If the media stream that cannot be received is defined as mandatory in a QoS policy for a media session or subsession, all the connection requests for that media session or subsession are cancelled in step 790. If, however, the media stream is optional, the communications manager continues processing further connection requests in step 720. Once all pending connection requests have been processed, the communications manager reports those that are viable to the session control system.

The processing of a session description will now be described with reference to FIG. 4 and session description example 4 which is the session description generated for Track 1 (modules 410 and 420–424 of FIG. 4).

(# overall conference session
   type=(base)
   id=(410)
   info=(title="Multimedia98 Conference")
   source=(owner="Joe Bloggs" email=joe@nowhere.com)
   media=(video=(client=RealPlayerG2) whiteboard=(client=wb))
   time(start="09:00 GMT 25/12/98" stop="13:00 GMT 25/12/98")
   options=(oc=0010)
   modules=(b=420 b=430 b=440 oc=411)
)
(# conference track 1
   type=(base)
   id=(420 410)
   info=(title="MM98 Systems and Applications Track")
   source=(owner="Joe Bloggs" email=joe@nowhere.com)
   media=(video=(client=RealPlayerG2) whiteboard=(client=wb))
   time(start-"09:00 GMT 25/12/98" stop="11:00 GMT 25/12/98")
   options=(osq=424)
   modules=(m=421 m=422 m=423 osq=424)
)
(#video for track 1
   type=(media)
   id=(421 420)
   info=(title="MM98 Systems and Applications Track Video")
   source=(owner="Joe Bloggs" email=joe@nowhere.com)
   media=(video=(type=live client=RealPlayerG2))
   connection=(226.0.0.100/1000)
   time=(start="09:00 GMT 25/12/98" stop="11:00 GMT 25/12/98")
)
(# audio for track 1
   type=(media)
   id=(422 420)
   info=(title="MM98 Systems and Applications Track Audio")
   source=(owner="Joe Bloggs" email=joe@nowhere.com)
   media=(audio=(type=live format—g711))
   connection=(226.0.0.101/1001)
   time=(start="09:00 GMT 25/12/98" stop="11:00 GMT 25/12/98")
)
(# whiteboard for track 1
   type=(media)
   id=(423 420)
   info=(title="MM98 Systems and Applications Track Whiteboard")
   source=(owner="Joe Bloggs" email=joe@nowhere.com)
   media=(whiteboard=(client=wb))
   connection=(226.0.0 102/1002)
   time=(start="09:00 GMT 25/12/98" stop="1:00 GMT 25/12/98")
)
(# session QoS for track 1
   type=(option-sQoS)
   id=(424 420)
   mandatory=(421 422)
   optional=(423)
)

Session Description Example 4

The session control system, having received the above session description, processes the tree structure of the session description starting at base module 410. The first module encountered is base module 420. As this is not a media module but it does have sub-modules, the session control system continues down this branch to media module.

The media field of the media module 421 already defines the multimedia client application required as RealPlayerG2 (a multimedia application of Real Networks Inc) thus the session control system ignores it and continues to the next media module. The media field of the media module 422 does not have a multimedia client application defined, however a format for the audio data is specified. The session control system recognises that this particular audio format can be supported by RealPlayerG2 so it amends the media field to read client=RealPlayerG2. The next media module 423 has already defined a client application as wb so it ignores this module, and it also ignores the option module 424.

The session control system parses the tree structure again in order to launch client applications. The first media module 421 specifies that RealPlayerG2 should be launched, hence the session control system launches the application on the end user's system and keeps a record of this activity. The second media module 422 specifies an application that has already been launched and so the session control system ignores it and continues to the next media module. The media module 423 specifies that wb should be launched, so the session control system launches the application and keeps a record of this activity.

RealPlayerG2 is passed the media module 421, base module 420 and modules 422–424. The application processes the media modules given to determine which it can handle, and in this case it identifies 421 and 422. Having determined which streams it can handle, the application sends a connection request back to the session control system requesting connection to the media streams of modules 421 and 422. Similarly, wb is passed the media module 423, base module 420, modules 421–422, and the module 424. The application processes the given modules as described previously, and requests connection to the media stream of modules 423.

The above connection requests are assembled by the session control system into a list, this list is then passed to the communications manager along with the session QoS policy module 424. The communications manager determines whether each request is viable according to the steps of FIG. 7.

Assuming there are sufficient resources for all the connection requests for mandatory media streams, the communications manager passes back a list of viable streams to the session control system which then processes the tree again to determine the connection data held in the connection field of each media module so it can request that the communications manager initiate a connection to the appropriate media stream for each of the viable connection requests according to the connection data. The session control system then manages the session and Its media stream connections as is described with reference to steps 670 to 700 of FIG. 6.

Due to the heterogeneity of the Internet and differing capabilities and operating environments of end user computer systems, the session control system described has been implemented in Java (Java is a Trade Mark of Sun Microsystems Inc.). The announcement receiving interface, Session Directory, receives the announcements and passes those selected by the end user to the session control manager implemented as an application programming interface running as a background process on the end user's computer.

Whilst the present invention has been described with reference to the Internet and multicast transmissions, it will be apparent to the reader that the described modular session description and the session control system are applicable to the announcement and subsequent management of connections to media streams of a (multi)media session using other known transport mechanisms such as unicast.

Furthermore, although mechanisms for encryption, charging and other such services have not been explicitly described, it would be apparent to the reader that appropriate session descriptions and associated functions within the session control system for their processing could be readily implemented according to the mechanism required.

What is claimed is:

1. A method of announcing a description of one or more of a plurality of media stream connections for a media session over a communication network, the method using a modular description system which is capable of providing a distributed announcement containing links available to a user to other portions of the announcement which have not yet been transmitted, said method comprising:

generating a session description comprising media oriented data necessary for a user to receive at least one media stream of a media session, said media oriented data identifying one or more application program components or requirements for one or more application programs or configurations of application program components necessary to participate in said media session; and, announcing the media session by making the session description available to potential recipients of the media session;

wherein said media oriented data necessary for a user to receive each media stream is generated in one or more respective media modules within the session description;

generating a first base module having a first data structure comprising user oriented data relevant to said plurality of media stream connections of the media session;

generating a plurality of media modules each having a second data structure and comprising media oriented data necessary for a user to receive a respective media stream of said plurality of media stream connections of the media session, said data including a network address for the respective stream connection;

providing links between the first base module and the media modules; and, announcing the media session by making at least the first base module available to users who are potential recipients of the media session, wherein the link between the first base module and the media module permits a user to request at least one media module and wherein said method includes, upon request from a user for one of said linked media modules, sending the requested media module to the requesting user, said user utilizing the stream address contained in said linked media module to subsequently receive the media stream.

2. A method according to claim 1, further comprising the steps of:

generating a second base module, the second base module containing user orientated data relating to a sub-session of the media session;

linking the second base module to the first base module; and, linking said at least one media module to the second base module.

3. A method according to claim 1, further comprising the steps of:

generating at least one options module having a third data structure comprising data related to service level criteria required to participate in the media session; and, linking each options module to a respective base module.

4. A method according to claim 3, in which the data contained in the options module relates to a quality of service policy to be used by the media session or a part thereof.

5. A method according to claim 3, in which the data contained in the options module relates to a security system to be used by the media session or a part thereof.

6. A method according to claim 3, in which the data contained in the options module relates to a charging system to be used by the media session or a part thereof.

7. A method according to claim 1, wherein one or more media module(s) comprise data necessary for a user to receive a layered media stream of a respective media session; and said method further comprises the step of linking each media module to one or more respective options module(s) containing data relating to a layered mechanism of the respective layered media stream necessary for a party to participate in the layered media stream.

8. A method according to claim 1, in which the data contained in a media module includes data necessary for a user to receive or transmit data or both receive and transmit for inclusion in the media session.

9. A method according to claim 1, in which the media session is announced by transmitting all of the constituent modules of the session description.

10. A method according to claim 1, in which the media session is announced by transmitting only some of the constituent modules of the session description, with the remaining modules of the session description being subsequently accessible by a user using one or more links provided in the modules transmitted.

11. A method according to claim 10, in which the remaining modules of the session description are held on one or more servers and the one or more links to the remaining modules are in the form of URI pointers.

12. A method according to claim 1, in which modules of the session description contain links to modules which are generated subsequent to the announcement.

13. A computer readable storage medium containing computer readable data which, when utilized by an executing computer program, defines at least a part of a description of one or more of a plurality of media stream connections for a media session over a communication network, the description comprising:

generating a session description comprising media oriented data necessary for a user to receive at least one media stream of a media session, said media oriented data identifying one or more application program components or requirements for one or more application programs or configurations of application program components necessary to participate in said media session; and, announcing the media session by making the session description available to potential recipients of the media session;

wherein said media oriented data necessary for a user to receive each media stream is generated in one or more respective media modules within the session description;

a first base module having at first data structure comprising user oriented data relevant to said plurality of media stream connections of the media session;

a plurality of media modules each module having a second data structure and comprising media oriented data necessary for a user to receive a respective media stream of said plurality of media stream connections of the media session, said data including a network address for the respective stream connection;

a link between the first base module and the media modules;

wherein the link permits a user to request at least one media module and subsequently receive the media stream.

* * * * *